US009183706B2

(12) United States Patent
Vancura

(10) Patent No.: US 9,183,706 B2
(45) Date of Patent: Nov. 10, 2015

(54) REEL-TYPE GAMES AND GAMING MACHINES

(71) Applicant: Olaf Vancura, Las Vegas, NV (US)

(72) Inventor: Olaf Vancura, Las Vegas, NV (US)

(73) Assignee: AGS, LLC, Las Vegas, NV (US)

( * ) Notice: Subject to any disclaimer, the term of this patent is extended or adjusted under 35 U.S.C. 154(b) by 322 days.

(21) Appl. No.: 13/631,537

(22) Filed: Sep. 28, 2012

(65) Prior Publication Data

US 2014/0094248 A1 Apr. 3, 2014

(51) Int. Cl.

| | |
|---|---|
| ***A63F 13/00*** | (2014.01) |
| ***G07F 17/34*** | (2006.01) |
| ***G07F 17/32*** | (2006.01) |

(52) U.S. Cl.
CPC .............. *G07F 17/34* (2013.01); *G07F 17/326* (2013.01)

(58) Field of Classification Search
CPC ............ G07F 17/3204; G07F 17/3211; G07F 17/3213; G07F 17/3265
USPC .......................................... 463/16, 20, 25, 26
See application file for complete search history.

(56) References Cited

U.S. PATENT DOCUMENTS

| | | | | |
|---|---|---|---|---|
| 7,381,134 | B2 * | 6/2008 | Cuddy et al. | 463/25 |
| 7,682,244 | B1 * | 3/2010 | Luciano et al. | 463/25 |
| 8,257,161 | B2 * | 9/2012 | Louie et al. | 463/20 |
| 2005/0075163 | A1 * | 4/2005 | Cuddy et al. | 463/20 |
| 2008/0096625 | A1 * | 4/2008 | Thomas et al. | 463/13 |
| 2009/0048010 | A1 * | 2/2009 | Kroeckel et al. | 463/13 |

* cited by examiner

*Primary Examiner* — James S McClellan
(74) *Attorney, Agent, or Firm* — Weide & Miller, Ltd.

(57) ABSTRACT

Games such as reel-type slot games may have various features, including: an attribute accumulate feature which a player attempts to form combinations of collectable special symbols; a geometric pattern feature in which symbols within a geometric pattern or area may take on special attributes or features; a moving trigger feature; a symbol-triggered game transformation feature using logical rules; a player symbol selection in which reel symbols are player selected; and a reel-locking feature.

18 Claims, 8 Drawing Sheets

REEL-TYPE GAMES AND GAMING MACHINES

FIELD OF THE INVENTION

The present invention relates to wagering games and gaming machines.

BACKGROUND OF THE INVENTION

Casinos continue to seek new and exciting games to present to players in order to maintain player interest. Some of the most popular casino games are mechanical and video slot machines in which physical reels are rotated to display slot symbols or a graphical representation of rotating slot reels is displayed to a player. These games have been implemented in various configurations, such as with reel symbols which relate to popular themes such as television shows or movies or the like. However, additional new and exciting features for these and other types of wagering games are still desired.

SUMMARY OF THE INVENTION

Embodiments of the invention comprise game features, games and gaming machines.

One embodiment of the invention comprises an attribute accumulate feature which a player attempts to form combinations of collectable special symbols. In one implementation of this feature, a reel-type game includes a number of reels which display slot symbols, wherein the slot symbols associated with each reel include at least one special symbol. In the event a special symbol is displayed by a reel as a result of a reel spin, that symbol may be collected. If the player collects a designated winning combination of special symbols over one or more reel spins, the player may be awarded an award.

Another embodiment of the invention comprises a geometric pattern feature in which symbols within a geometric pattern or area may take on special attributes or features. In one implementation of this feature a plurality of slot reels display symbols in reel symbol positions. A geometric identifier, such as a displayed perimeter or pattern designator, designates one or more of the symbol positions. In one embodiment, if a Wild symbol is displayed in one of the symbol positions designated by the geometric identifier, then all symbols designated by the geometric identifier may take on a secondary attribute, such as by becoming Wild symbols.

Another embodiment of the invention comprises a moving trigger feature. In one implementation of this feature slot symbols are displayed by a plurality of slot reels. A moving trigger, such as an icon, is moved relative to the displayed reels and symbols. If the moving trigger interacts with a reel or symbol, such as by moving to and then stopping at a particular displayed reel or symbol, the symbol or reel may take on a secondary attribute, such as by becoming a Wild symbol(s).

Another embodiment of the invention comprises a symbol-triggered game transformation feature using logical rules. In one implementation of this feature, a plurality of reels display slot symbols. In the event of a particular trigger, such as the appearance of a trigger symbol in a particular symbol position, the condition or the status of the game is evaluated. Depending upon the condition of the game, certain designated features are implemented based upon designated, logical rules. For example, in the event of a first game condition, one of a first set of features is implemented. In the event of a second game condition, one of a second set of features is implemented.

Yet another embodiment of the invention comprises a player symbol selection in which reel symbols are player selected. In one implementation of this feature, a player selects one or more slot symbols. Each designated slot symbol is associated with each reel of a reel-type slot game for use in the game.

Another embodiment of the invention comprises a reel locking feature. In one embodiment, each reel of a set of reels has at least one associated special symbol, such as a Wild symbol. The reels are spun and evaluated for winning outcomes. If a reel displays a special symbol, it is then locked and the remaining reels are spun and then the outcome of the spin is then evaluated once again. Spins continue until all reels are locked.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise game features, methods of playing and presenting games, and gaming machines and/or gaming systems which are configured to implement the game features and games. In general, embodiments of the invention comprise, but are not limited to: (1) an attribute accumulate feature as well as a reel-type game in which a player attempts to form combinations of collectable special symbols; (2) a geometric pattern feature as well as a reel-type game in which all symbols within a geometric pattern or area may take on special attributes or features; (3) a moving trigger features as well as a reel-type game having such a feature; (4) a symbol-triggered game transformation feature using logical rules as well as a reel-type game having symbols which cause game transformations in accordance with logical rules; (5) a player symbol selection feature as well as a reel-type game in which reel symbols are player selected; and (6) a reel locking feature and games and gaming machines having the reel locking feature.

In a preferred embodiment, the methods of game play and presentation are implemented via a gaming machine or device 22. Such a gaming machine 22 may have various configurations. The gaming machine 22 may be located at a casino (and as such is referred to as a "casino gaming machine"). As described below, the gaming machine 22 may be part of a gaming system, such as a casino gaming system which links multiple of the gaming machines, one or more table games and other devices such as kiosks, accounting systems or servers, progressive systems or servers, player tracking systems or servers or the like.

Figure 1:
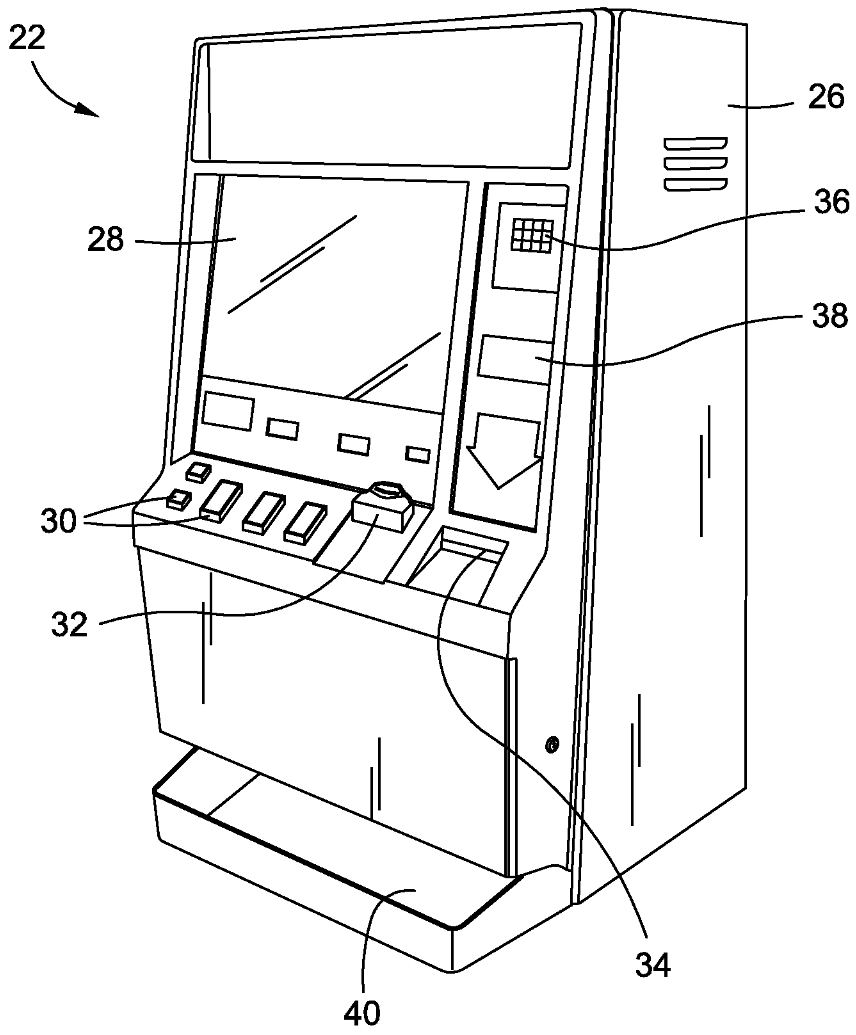
FIG. 1 illustrates an embodiment of a gaming machine in accordance with the present invention.

One configuration of a gaming machine 22 is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one display device 28 configured to display game information. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touch-screen, a light emitting display (LED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events.

In another embodiment, the gaming machine 22 may include one or more physical reels capable of displaying symbols. In such a configuration, means are provided for rotating the physical reels. In one or more embodiments, a player's input to a spin button or a spin arm (a "pull") causes the reels to spin. In a preferred embodiment, electronically controlled mechanisms are arranged to rotate and stop each reel. Such mechanisms are well known to those of skill in the art. In such an arrangement, actuation of the spin arm or depression of the spin button causes a controller (not shown) to signal the activation of the spin mechanism associated with one or more of the reels. Preferably, the controller is arranged to either turn off the signal to the device(s) effecting the rotation of each or all of the reels (such as one or more electrically powered stepper motors) or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

As described in more detail below, the gaming machine 22 is preferably configured to present one or more games upon a player making a monetary payment or wager. In this regard, as described in more detail below, the gaming machine 22 includes means for accepting monetary value.

In one embodiment, as detailed above, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game, to indicate cards to be held or discarded, to "cash out" of the gaming machine, or to provide various other inputs.

In one preferred embodiment, the gaming machine 22 includes at least one microprocessor-based controller or CPU microprocessor or controller for controlling the gaming machine, including receiving player input and sending output signals for controlling the various components of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information representing images of displayed cards), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. The memory may also store other information, such as pay table information. The gaming machine 22 may also include one or more random number generators for generating random numbers, such as for use in selecting cards and for presenting the game in a random fashion.

Preferably, the controller is configured to execute machine readable code or instructions which are configured to implement the method of game play of the invention. For example, the controller of the gaming machine 22 may be configured to detect a wager, such as a signal from a player's depressing of the "bet one" button. Upon such an event and/or the player otherwise signaling the gaming machine to present the game, the controller may be configured to cause slot reels to spin or a graphical representation of spinning slot reels to be displayed on the at least one display 28.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. Thus, the gaming machines 22 is preferably configured to accept value, such as in the form of coins, tokens, paper currency or other elements or devices representing value such as monetary funds. For example, as illustrated in FIG. 1, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22. The gaming machine 22 might also be configured to receive information regarding funds associated with a player's financial account, such as funds associated with a player's casino deposit account or bank account, which account information might be stored elsewhere, such as in association with a casino's accounting system.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22 dispensing coins to a coin tray 40. In another embodiment, funds may be issued by dispensing paper currency. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference.

The gaming machine 22 may also include a player tracking device, such as a card reader 36 and associated keypad 38. Such player tracking devices are well known and may permit the game operator to track play of players of the gaming machine. The tracked play may be utilized to offer player bonuses or awards.

It will be appreciated that the gaming machine illustrated in FIG. 1 is only exemplary of one embodiment of a gaming machine. For example, it is possible to for the gaming machine to have various other configurations, including different shapes and styles and having different components than as just described.

For example, it is possible for the game of the invention to be presented on a computing device, including at a home or office computer. In one embodiment, a player might log in to a casino server and the controller of the casino server may cause game information to be delivered to the player's computer and then be displayed on a display of the player's computer. In this regard, it will be noted that the term "controller" may comprise more than one device. For example, in a server-based environment, a controller at a server may generate game information and transmit that information to a local controller at a gaming machine. The local controller at the gaming machine may then cause game information to be displayed on the display of the gaming machine. The games of the invention could also be presented by or at hand-held devices, such as PDAs, cellular phones, tablet computing devices or the like.

It is also possible for a gaming machine 22 to have a top box, secondary display or the like, which secondary feature may be configured to display base game, bonus event or other game information. For example, a gaming machine 22 may be configured to display a base game on a main display 28 thereof and include a top box which has an associated display (such as a video display and/or physical reels) which is configured to display a bonus event.

A casino may have numerous such gaming machines 22, such as located on a casino floor or in other locations. Of course, such gaming machines 22 might be used in other environments, such as an airport, a bar or tavern or other locations.

(1) Attribute Accumulation

One embodiment of the invention comprises an attribute accumulation feature and games and gaming machines having an attribute accumulation feature. In one embodiment of the invention, collectable attributes are associated with a plurality of symbol-displaying reels. The reels may be physical reels or video representations thereof. In a preferred embodiment, one or more of the reels has an attribute, such as a particular indicia or symbol (referred to herein as a "special" symbol), which may be collected by the player. Preferably, there are at least two special symbols which are associated with at least two different reels, whereby a player is awarded an award for collecting at least two different special symbols in conjunction with two or more reels. However, as described below, the invention may have other configurations.

For example, in one embodiment of the invention, a game may comprise the spinning of five (5) reels, each reel configured to display at least one of a plurality of different indicia or symbols. In a preferred embodiment, a first of the reels includes a set of indicia which includes the special symbol B, a second of the reels includes a set of indicia which includes the special symbol O, a third of the reels includes a set of indicia which includes the special symbol N, a fourth of the reels includes a set of indicia which includes the special symbol U, and a fifth of the reels includes a set of indicia which includes the special symbol S. Each reel is preferably configured to display symbols or indicia other than the special symbol, whereby the probability that each reel will display the special B, O, N, U and S symbol associated therewith is less than 100%. For example, the first reel might have 40 symbol positions and the B symbol might occupy only one of the positions, with one or more other symbols or indicia occupying the other positions.

In a preferred embodiment of the game, the reels are rotated and stopped so as to cause one or more of the symbols associated with each reel, but not all the symbols, to be displayed as a random outcome (as indicated above, in the case of physical reels, the reels may free-wheel to a stop or may be stopped in a randomly determined position; in the case of video-represented reels, a video representation of rotating reels may be displayed along with a video representation of a randomly selected stopping position). For example, if each reel has 40 associated symbols, the result of the spin of each reel may be the display of 3 of the 40 symbols (or alternatively a greater number of symbols may be displayed but only a portion of the displayed symbols may be used in determining the outcome of the game).

If the any of the reels display a special symbol, such as the above-referenced B, O, N, U or S symbols, then that special symbol is collected and retained by the player. For example, in a video reel game, the displayed special symbol may be re-displayed or may be moved from the reel to a position immediately above the reel which displayed that symbol or alternatively, be re-displayed in or moved to a special symbol collection area or the like.

In one embodiment, if the player is successful in collecting certain combinations of the special symbols, then the player is awarded an award. For example, if the player is successful in collecting all of the special symbols B, O, N, U and S which are associated with each individual reel, then the player may be awarded a special award.

The player may only be given a designated number of opportunities to collect the special symbols. In a preferred embodiment, the player is given two or more reel spins wherein each of the two reels spins presents an opportunity for one or more of the special symbols to be randomly displayed. In a preferred embodiment of the invention, the game is presented as a bonus event from a base game or event. For example, a player may place a wager to play a base game or event. Upon the occurrence of one or more triggers, such as particular outcomes, random selection or the like, a bonus game may be presented. In accordance with the bonus event, the player may be awarded one or more bonus spins of reels which include the special symbols as described above. The bonus spins may be free spins. Preferably, the player is awarded at least two free spins, though the player may be awarded other numbers of spins. In a preferred embodiment, additional spins may be awarded within the bonus game or event, either through reel triggers or the selection of objects, as one example.

In one embodiment, a special symbol may be collected if it appears in one or more specified locations on a reel. For example, in a reel game where each reel has a number of associated symbols or indicia but only displays a sub-set thereof (such as displaying 3 of 40 total symbols), the special symbol may be collected anytime it is displayed by the reel. In other embodiments, one or more pay lines may be associated with the reels and a special symbol may only be collected if it appears along a designated or active pay line (such as a pay line which has been activated based upon a wager of a particular size).

In one embodiment, if a player has collected a particular special symbol associated with a reel and hits that same symbol again, the player may then be awarded an award. In another embodiment, once the special symbol is collected, its position on a reel may convert to another symbol, such as a Wild or Wild with multiplier (2×, 3×, etc.). If the reel has multiple instances of the particular special symbol, then collecting the special symbol may cause all instances of that collected special symbol to covert (e.g. if a player collected a B symbol associated with a first reel and that reel had five B symbols, all five B symbols might convert to Wild symbols).

If the player collects a first combination of the special symbols and the player has additional spins remaining, the player may be awarded a first level award and continue to try and collect a second combination of the special symbols. For example, the reels may be configured to display the special symbols B, O, N, U and S in different colors (e.g. the first reel may display the special symbol B in red, white and blue colors). If a player collects the B, O, N, U and S symbols in red, the player may then be awarded a first level award and then try and collect the symbols in white and/or blue. In another embodiment, the special symbols may all be of the same color (or otherwise have the same identifying attribute such as stripes, etc.) and a secondary indicator may be used to indicate to a player when they are collecting a second set of the symbols. For example, all of the special B, O, N, U and S symbols might be colored blue. Once a player collected all of those symbols, the B, O, N, U and S symbols depicted above the reels may turn another color, such as yellow, whereupon the player continues to collect the next set of blue colored special symbols from the reels.

Figure 2:
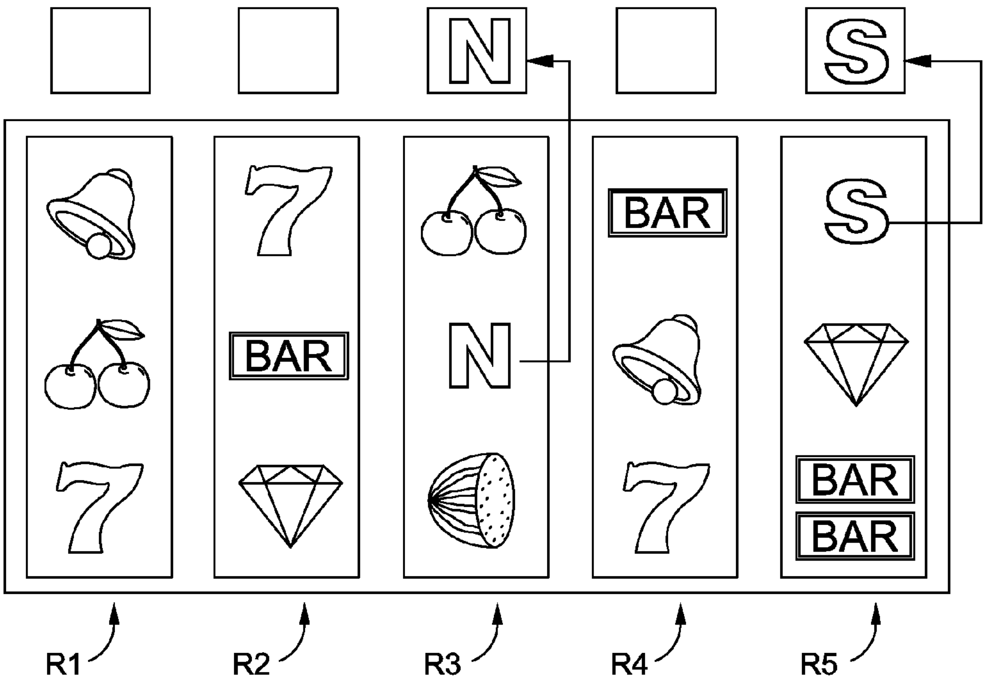
FIGS. 2 and 3 illustrate an example of a first game feature of the present invention.

FIG. 2 illustrates one example of the invention wherein the game utilizes five reels R1, R2, R3, R4 and R5. The first reel R1 is configured to display at least one B symbol, the second reel R2 is configured to display at least one O symbol, and so on. In this example, a spin of the reels R1-R5 has resulted in the third reel R3 displaying the special symbol N and the fifth reel R5 displaying the special symbol S. The collection of these symbols is displayed by moving them to collection positions at the top of the reels.

Figure 3:
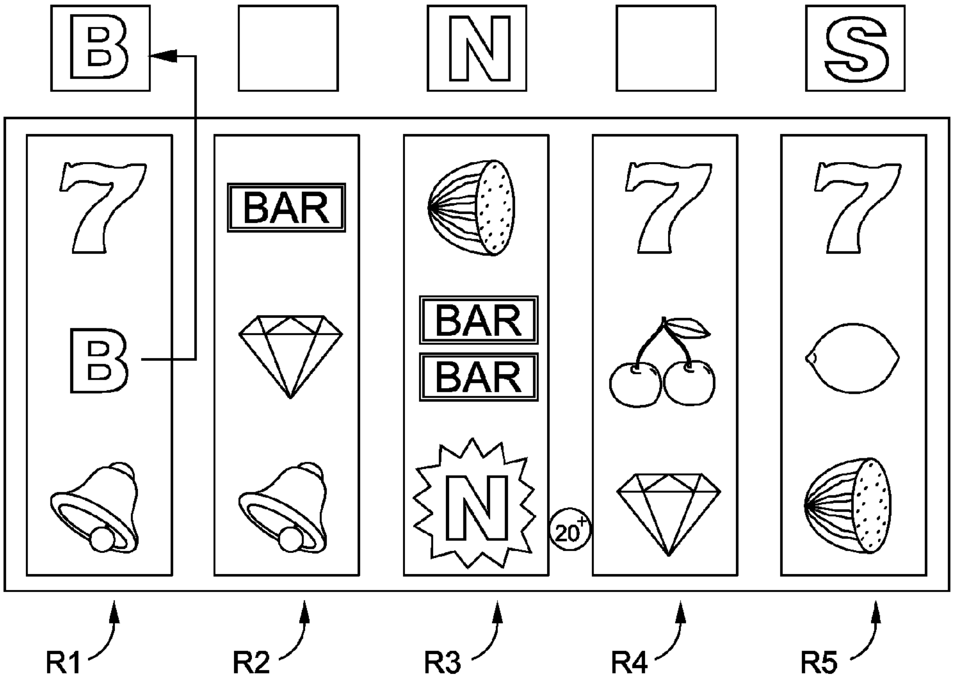

As illustrated in FIG. 3, as a result of a second spin of the reels, the first reel R1 has displayed the special B symbol. This symbol is thus collected, such as by moving it up to the top of the reel. As a result of the second spin, the third reel R3 has displayed the special N symbol. Because the player has already collected an N symbol, the second occurrence of the N symbol has resulted in a special award of 20 credits.

If the player had no more remaining spins, the player may not be awarded an additional award for collecting only the B, N and S symbols. However, if the player is entitled to additional spins, the player may collect additional occurrences of the special symbols.

Of course, the special symbols or indicia may have various forms. For example, instead of the letters B, O, N, U and S, coin symbols may be utilized. For example, each reel might be configured to display at least one Gold Coin, Silver Coin and Bronze Coin. The coins are collected as they are displayed by the reels. Once the player collects at least three of a particular coin from a single reel, such as three Silver Coins associated with a second reel, then the player may be awarded an award. Alternatively, Gold, Silver and Bronze Coins may appear on each of the five reels. The last coin appearing on a particular reel is moved to the top of the reel (or other display area). After each spin of the reels, a check is made to see if the player has achieved a "three of a kind" of any particular coin at the top of the five reels. Such a "three of a kind" may comprise a game-ending event (otherwise, spins may continue until such a result is obtained).

For example, if the symbols shown at the top of five reels after one or more spins were Gold Coin, Bronze Coin, Silver Coin, Gold Coin and Bronze Coin, then play would continue because the player had not achieved a combination of three of any of the same coins. If the next spin resulted in a Gold Coin appearing on the $5^{th}$ reel, then that Gold Coin would be moved to the top of the reel in replacement of the Bronze Coin (such that the collected symbols at the top of the reels comprise Gold Coin, Bronze Coin, Silver Coin, Gold Coin and Gold Coin—i.e. the set includes three Gold Coins). In a preferred embodiment, this would end the event (such as end any additional free spins) and result in an additional award or a bonus award for the receipt of three Gold Coins. Similarly, instead of Gold, Silver and Bronze Coins other symbols or indicia might be used, such as playing card indicia (Ace, King, Queen, etc.). In the case of playing card special symbols, a player might be required to achieve a specific combination of cards, such as one or more designated poker hands, in order to achieve a winning outcome (e.g. a four of a kind, a flush, etc.)

It is possible for only one of the reels to have an associated special symbol or collectable attribute. For example, the first reel of a set of reels may be capable of displaying one or more gold coin symbols. If the player collects a minimum required number of such symbols, the player may be awarded an award.

It is also possible for the collectable attributes to comprise other than primary symbols displayed by reels. For example, small coin symbols might be displayed adjacent to one or more primary symbols, wherein the primary symbol may be used to form primary game outcomes and if a secondary special symbol is displayed, that symbol may also be collected. It is also possible for one or more or all of the reels to have more than one associated special symbol. For example, a first reel R1 may have 40 associated symbols, three of which are B symbols, thus increasing the probability of the player receiving the special symbol.

The above-referenced awards may comprise awards of one or more credits. As indicated herein, the game feature may be implemented as part of a base game or as part of a bonus event or feature. In a base game implementation, the player might be awarded awards for combinations of non-special symbols and then be awarded an additional award for collecting designated combinations of special symbols. In a bonus event implementation, the player may be awarded an award for a winning base game outcome and then be awarded a bonus award for collecting designated combinations of special symbols during the bonus event. In a preferred bonus event implementation, the player places a wager to play the base game but is not required to place a wager to spin the reels one or more times during the bonus event.

(2) Geometric Patterns

Another embodiment of the invention comprises a geometric pattern feature and games and gaming machines having such a feature. In accordance with a reel-type slot game, one or more reels display indicia or symbols. Preferably, a plurality of reels is configured to display a sub-set of symbols from a larger set of symbols. For example, each of five reels may be configured to display 3 symbols from a set of 40 symbols associated with the particular reel.

In a preferred embodiment, a geometric pattern or area may be displayed in association with the reel display. The geometric pattern preferably designates some area of the reel display area. For example, as illustrated in FIG. 3, a reel-type game may include five reels R1, R2, R3, R4 and R5. Each reel may be configured to display three symbols, whereby a 5×3 matrix of symbols is displayed as a result of each reel spin.

As further illustrated, a geometric pattern G is displayed in association with the reel symbol positions. In this example, the geometric pattern G encompasses or includes all of symbol display areas or positions of the second reel R2 and the third reel R3.

Of course, the geometric pattern may have various shapes or forms, including depending upon the number of reels, symbol display positions and the like. Preferably, the geometric pattern designates some, but not all, of the symbol display positions. The geometric pattern may be designated by a designator, such as a perimeter outline, symbol position highlight or other indicator such as one or more wallpaper-like modifications of the reels or the background patterns thereof.

In one embodiment, all of the symbols within the defined geometric pattern or area may take on special attributes at one or more times. For example, in one embodiment of a game, symbols within the geometric area or pattern may have their primary attribute (the particular symbol attribute) and a wild attribute.

Figure 4:
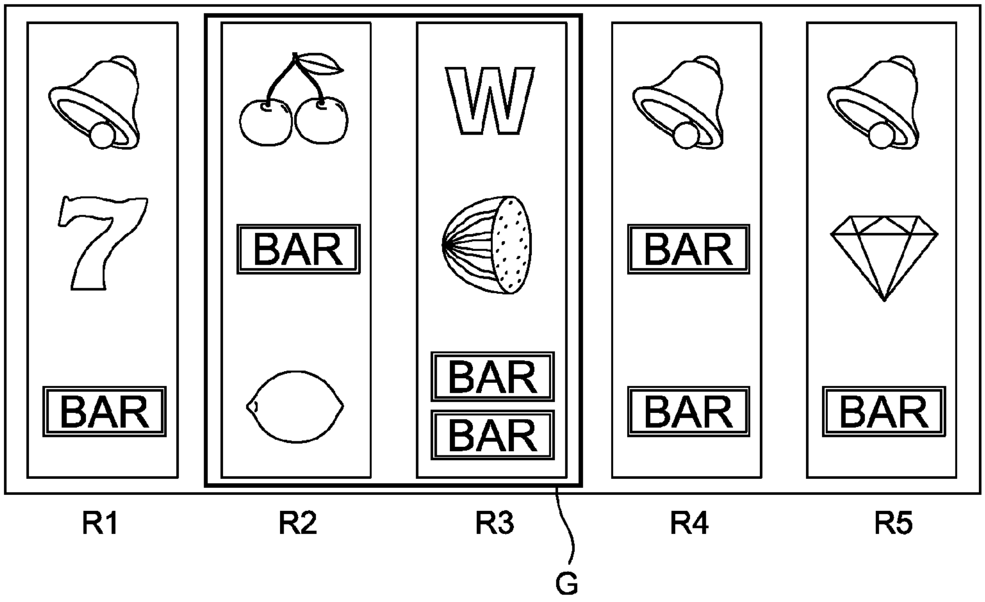
FIGS. 4 and 5 illustrate an example of a second game feature of the present invention.

As one example, one or more of the reels is configured to display a Wild (or W) symbol. The Wild symbol preferably has the attribute that it has the form of or matches to every other symbol. In one embodiment, each reel may include at least one Wild symbol. In accordance with the invention, if a Wild symbol is displayed in any of the reel symbol display positions within the geometric pattern, then all symbol positions in that geometric area become or transform to Wild symbols (for at least that spin). For example, in referring to FIG. 1, as a result of a first reel spin, a wild symbol W has been displayed in the top display position of the third reel R3. Because this position is encompassed within the geometric pattern G, as illustrated in FIG. 4, all symbols within that pattern or area G become wild (in the illustrated example Wild symbols are shown in those positions to reflect that those positions are now wild; it is possible for the actual symbol in the designated position may be converted to a wild symbol such that the original symbol is actually removed relative to future spins).

Figure 5:
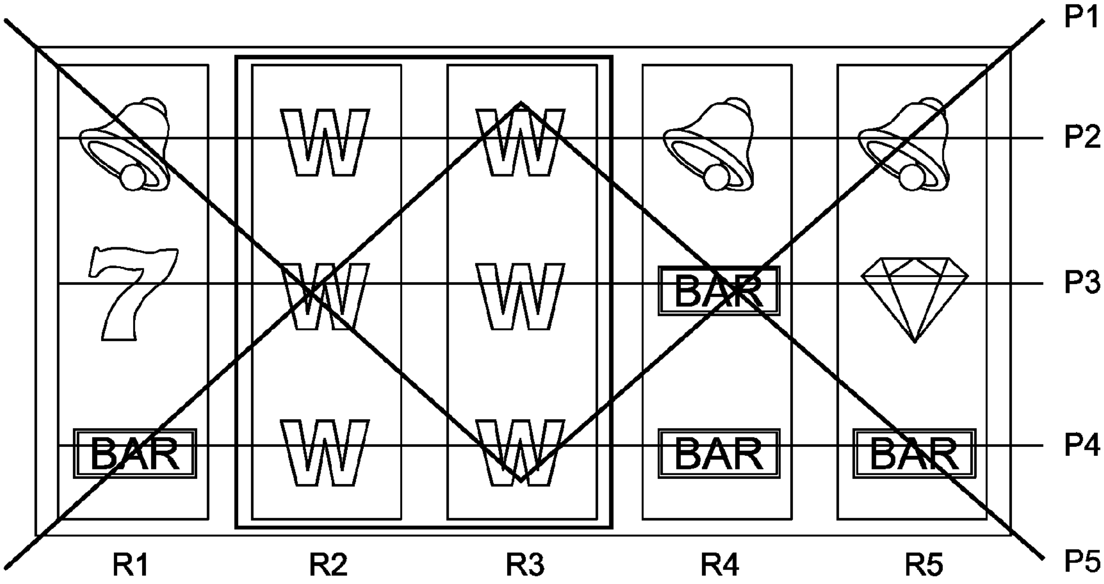

Preferably, the outcome of the game is then determined with reference to the resulting combination of symbols. Of course, the combinations of symbols may be evaluated in many ways, including for numerical occurrences of each particular symbol (i.e. a "scatter" of particular symbols—i.e. a minimum aggregate number of the same symbol displayed anywhere by the reels), whether certain combinations of symbols have occurred along particular pay lines or the like. For example, referring to FIG. 5, symbols are being evaluated along 5 pay lines P1, P2, P3, P4 and P5. In this example, a winning outcome has been received for combinations of symbols along pay lines P2 (for 5 Bells), P4 (for five BARS) and P5 (for 5 BARS). Particular winning combinations of symbols may have associated awards, such as awards of one or more credits.

In one embodiment of the invention, the geometric pattern or area may only be designated at particular times or upon specific events. For example, a player might be required to place a maximum wager or place a side bet in order to activate the geometric pattern feature.

Of course, the symbols which are located within the defined geometric area might take on other secondary attributes. For example, aside from their primary symbol designations as used to determine winning symbol combinations (such as along pay lines or in a scatter configuration), each symbol within the defined geometric area might yield a specific bonus award or pay or might take the form of two or more symbols (rather than a wild format wherein the symbol takes the attributes of all other symbols).

The game of the invention may be implemented as a base game or in a bonus event or the like. For example, a base game may include a display of the geometric pattern and wild transformation feature. In another embodiment, a base game may not include such a feature but a bonus event may include such a feature. In a preferred embodiment, the feature occurs randomly in a base game but occurs on every spin within a free spin bonus game.

In another embodiment, the symbols which appear or land within the geometric pattern or area are evaluated according to a symbol hierarchy and the highest ranked symbol is then replicated to fill all of the symbols within the geometric pattern or area. For example, if a + geometric pattern/area had symbols S2, S4, S5, S7 and S9 in the positioned defined by the pattern and the symbols had a ranking of S1 (highest) to S10 (lowest), then all of the symbols in the positions associated with the pattern would convert to S2 symbols. In one embodiment, the symbol combinations (by pay line, scatter or the like) are evaluated both before and after any symbol conversion within the geometric pattern. In another embodiment, particularly suited to conversation of symbols to Wild symbols if a Wild symbol appears within the geometric pattern/area, the evaluation only occurs after the conversion of the symbols.

(3) Moving Triggers

Another embodiment of the invention comprises a moving trigger feature and games and gaming machines having a moving trigger feature.

In one embodiment of the invention, an icon or other element may be configured to move about a game area, thus changing attributes of an underlying game. As one example, a game may comprise a reel-type game which includes a plurality of reels. Each reel may be configured to display one or more, but not all, of a set of associated reel symbols. A base outcome of the reel-type game may be determined relative to the symbols which are displayed by the reels. For example, the symbols which are displayed by the reels after a spin may be evaluated along one or more pay lines, based upon their aggregate number (i.e. scatter), or otherwise.

In one embodiment of the invention, the game may include a moving trigger. The trigger may comprise an icon, symbol or the like which is displayed relative to the base or underlying game. The trigger may be a special symbol which is associated with a reel that lands on the reel as a result of a spin or the trigger may randomly appear on the reel(s), not necessarily as a direct result of a reel spin which caused the symbol to be displayed in a particular position.

In a preferred embodiment, the position of the trigger may change or move. In a preferred embodiment, the trigger has wild attributes and moves to other locations, making those symbol positions wild. In another embodiment, interaction of the trigger with the base game, such as movement of the trigger to certain locations of the base game, may trigger certain secondary events or features. For example, relative to a base reel-type game in which symbols are displayed in symbol locations, movement of the icon to a particular symbol position may cause the symbol position to take on a secondary attribute such as becoming wild or the like (including becoming wild with a multiplier, such as 2×, 3×, etc.), making all of the symbol positions of a reel wild, or the like. Alternatively, the trigger may act in a special way upon a subset of all of the symbol positions. The trigger may generally have wild attributes but if it lands upon an existing Wild symbol, it might cause that Wild symbol to be wild with a multiplier (e.g. 3×, 4×, etc.) or if the trigger lands upon another special symbol, a random number of additional symbols or symbol positions may become wild, etc.

Figure 6:
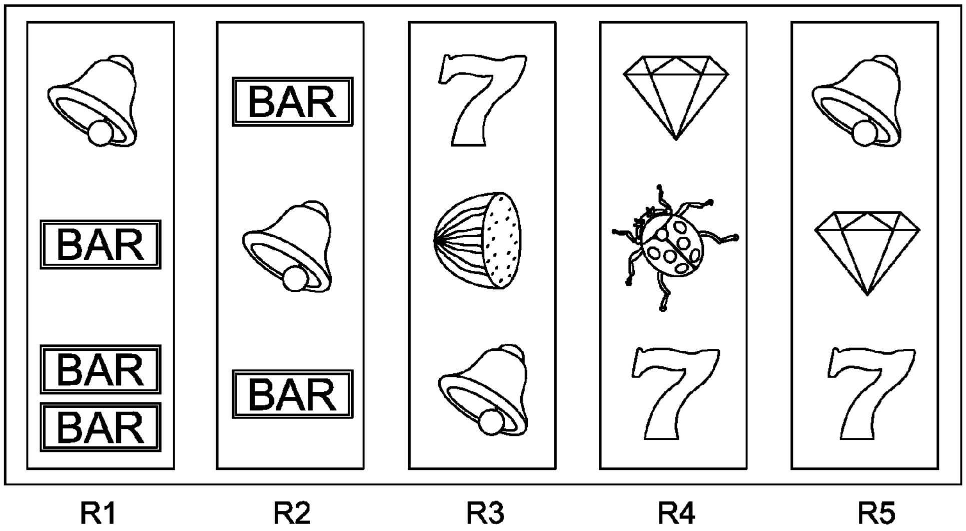
FIGS. 6 and 7 illustrate an example of a third game feature of the present invention.
Figure 7:
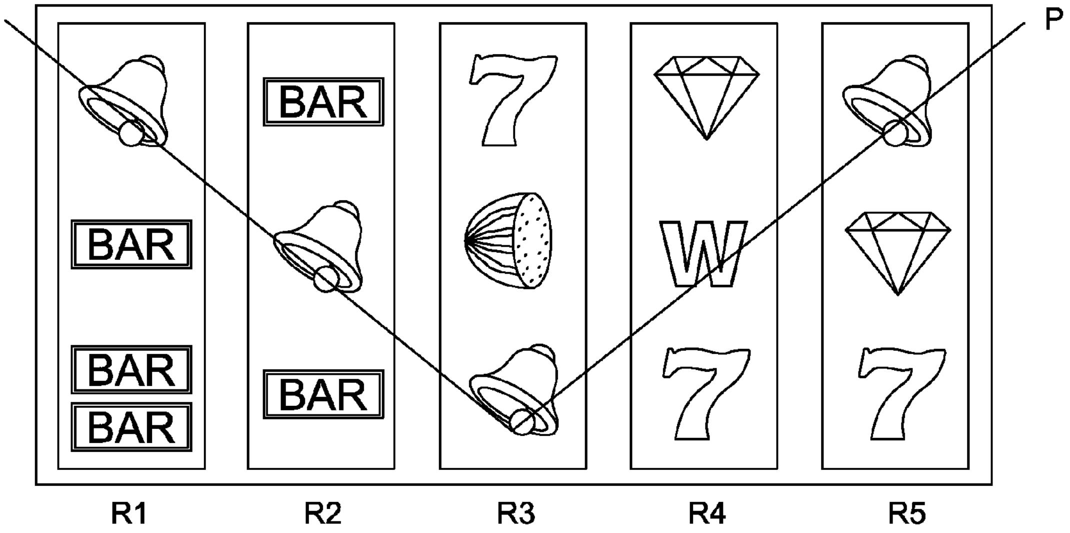

FIGS. 6 and 7 illustrate one example of a game which includes such a feature. As illustrated in FIG. 6, an icon such as a ladybug L may be displayed relative to a set of reels. As shown, five reels R1, R2, R3, R4 and R5 are being used to display reel-game symbols. In one embodiment of the invention, the ladybug L starts at a position in which it is not associated with a particular reel symbol, such as at a position above the reels. At one or more times, as illustrated, the ladybug L may move to a position in which it is associated with a particular symbol position. For example, the reels might spin and stop in the locations illustrated in FIG. 6. During the reel spin, the ladybug L may be shown at the top of the reels, along the side of the reels, at the bottom of the reels or even crawling over the reels. The ladybug L may be stationary or moving. When the reels top rotating, the ladybug L may move onto the reels and stop at one or more of the specific symbol locations.

As illustrated in FIG. 6, the ladybug L stopped at the middle position of the reel R4. In accordance with one embodiment of the invention, the original symbol shown at that position (BAR) is then transformed to a Wild symbol (i.e. has the attributes of all symbols), as illustrated in FIG. 7. Preferably, once the symbol is transformed, the outcome of the game is evaluated with reference to the final set of symbols. For example, as illustrated in FIG. 7, a winning result may be declared along pay line P (for a combination of five Bells, whereas the original set of symbols along that pay line may have been losing by only comprising four Bells and a BAR). In a preferred embodiment, the BAR symbol is not transformed to a Wild symbol, but the ladybug L has the word "WILD" displayed on her back, so that her final resting symbol position becomes wild.

As indicated, this feature of the invention may have various implementations. For example, in one embodiment a moving trigger may land on a reel and make all displayed symbol positions wild. In another embodiment, more than one moving trigger might be activated, wherein each moving trigger might trigger other actions. For example, a player might collect moving triggers, such as four ladybugs. Those ladybugs may then move to engage or land upon one or more reels or reel symbols. In another embodiment, a moving trigger may remain active for a period of time. For example, a moving trigger might remain associated with the game over a number of spins, moving about to engage the one or more reels or reel symbols during or after some or all of those spins. In one embodiment, the feature which is triggered by the moving trigger may also remain in effect for a period of time. For example, a player may be given a number of free reel spins. After the first reel spin the moving trigger may transform one of the symbols to a Wild symbol (i.e. a non-Wild symbol on the reel is converted to or replaced with a Wild symbol). In such instance that reel position is effectively converted to wild for all successive spins (since that position is filled with a Wild symbol). In other configuration a particular symbol position may be designated as wild for that particular spin relative to a particular symbol which is shown in that position (but the symbol itself is not changed, such that upon a successive spin that symbol may be displayed and is not wild). In another configuration, a symbol position may remain wild for a number of subsequent spins, with the reels appearing to spin underneath the designated wild position.

Of course, the moving trigger feature may be associated with a base game, bonus event or other game implementation. In an embodiment where the moving trigger turns one or more symbols to a wild symbol, an initial outcome of a reel spin may be evaluated for one or more winning outcomes with reference to the symbols displayed by the reels and then the symbols may then be re-evaluated for one or more wins after the one or more symbols have been transformed to Wild symbols, thus giving the player two or more chances to win.

The moving trigger(s) may have various configurations. While a moving trigger might have the form of a bug, animal or the like, the moving trigger might comprise a balloon. In one configuration, one or more hot air balloon symbols are shown in relation to one or more reels. If a balloon lands on a reel, it may transform the symbol it lands upon into a Wild symbol. Alternatively, the balloon may depict the word "WILD" on itself and simply convert the symbol position landed upon to be wild for that spin outcome.

Of course, the moving triggers may have other features. For example, relative to the balloon example, a player may be awarded a number of free reel spins. After a balloon lands on a particular reel symbol position it may move upwardly relative to the reel (such as one reel position) after each spin (and transforming each symbol position to a Wild symbol). After reaching the top of the reel it may float into a capture area.

After all of the player's free spins, all of the balloons in the capture area may pop or explode and then fall back onto the reels, thus making a large potential number of reel positions Wild symbols on the final spin.

In yet another embodiment, the moving trigger may interact with each other. For example, a male and female rabbit may be used as moving triggers. The male and female triggers may move but always land upon the $3^{rd}$ reel. If they should happen to land upon the same symbol position, they then "mate" and two additional baby rabbit triggers result. The baby rabbit triggers may only move onto reels 1, 2, 4 and 5 (e.g. not reel 3). In this manner, moving triggers may spawn additional moving triggers and/or interact with each other in various ways.

The moving triggers may move in various configurations. In one embodiment, movement of the moving trigger may be random. For example, a reel position may be randomly selected and then at the end of a spin the moving trigger may be graphically illustrated to move to that selected position. However, the moving triggers could be designed to move in specific patterns or be moved in part based upon player input.

(4) Symbol Transformation According to Logical Rules

One embodiment of the invention is a symbol transformation feature and games and gaming machines having such a feature.

In one embodiment of the invention, one or more triggers, such as the appearance of a particular special triggering symbol, cause the game to transform in accordance with one or more logical rules. In a preferred embodiment, this feature is implemented relative to a reel-type game, such as game which uses physical spinning reels or graphical representations of spinning reels.

In one embodiment of a game, one or more reels are spun and the initial outcome of the reel spin is evaluated. First, the symbols which are displayed by the reels may be evaluated for one or more winning combinations of symbols. In the event of a winning combination of symbols (such as along one or more pay lines or in a scatter configuration or the like, and relative to one or more pay tables), the player may be awarded winnings, such as one or more credits.

Figure 8:
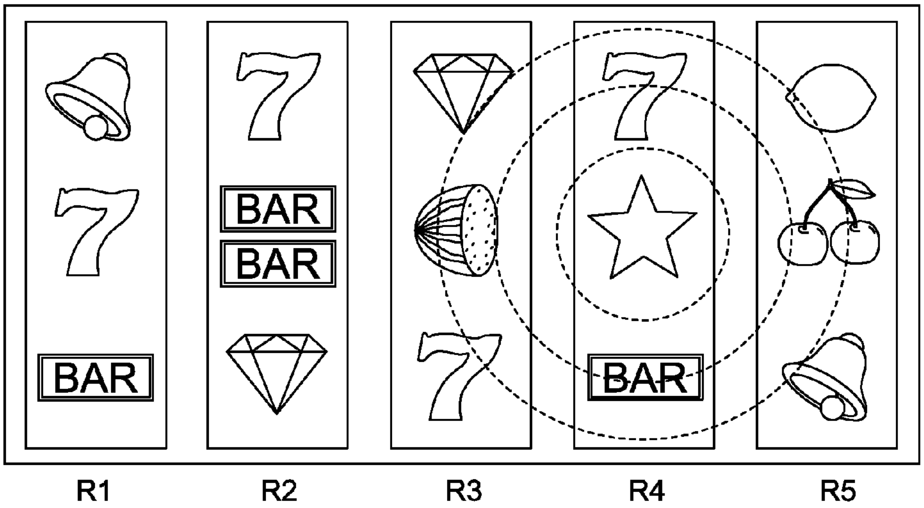
FIG. 8 illustrates an example of a fourth game feature of the present invention.
Figure 9:
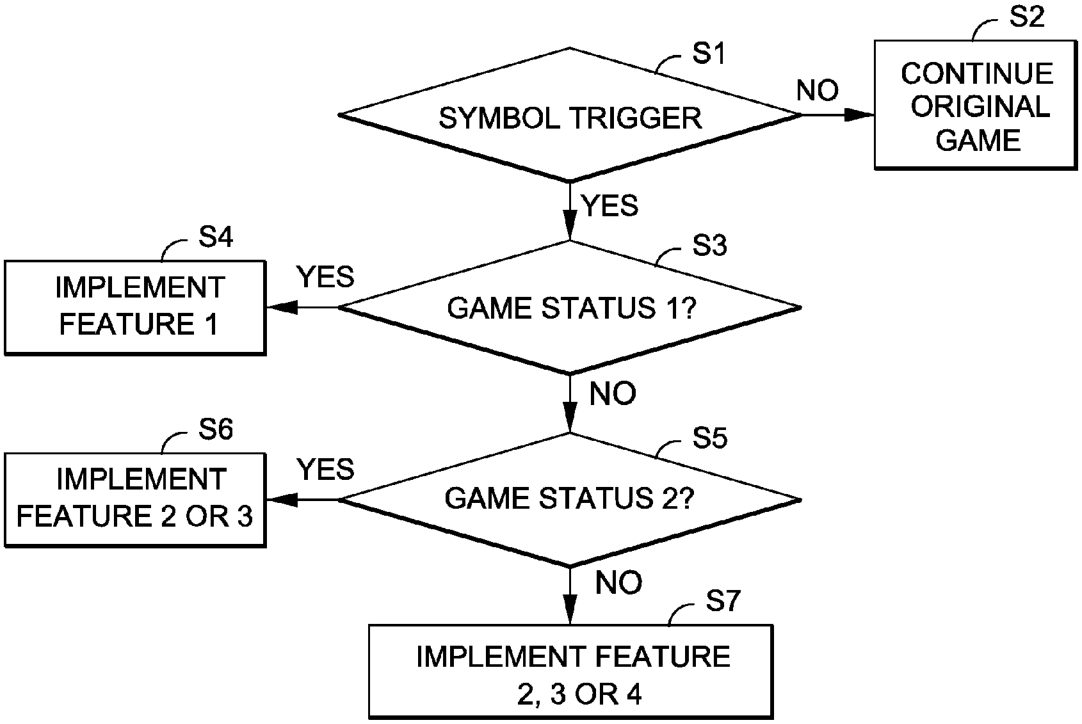
FIG. 9 is a flow diagram of a fourth game feature of the present invention.

In addition, as illustrated in FIG. 9, the reel spin is evaluated for a triggering event. In one embodiment, in a step S1, the reels are evaluated for a symbol trigger. The symbol trigger may comprise the appearance of a special triggering symbol among the symbols displayed by the reels as a result of the spin. In a preferred embodiment, the symbol trigger may comprise the appearance of a special triggering symbol in a particular reel display position, such as in one of the positions of a third reel when there are five reels. For example, the symbol trigger may comprise the appearance of a STAR symbol on a fourth reel, as illustrated in FIG. 8.

If no symbol trigger exists, then in a step S2, the original game may continue (in one embodiment, this may comprise the end of the game).

If a symbol trigger exists, then the game condition or game status is evaluated and, depending upon the game status, one or more game features are implemented in accordance with logical rules. For example, in a step S3, a determination is made as to whether a first game condition or status has been met. In one embodiment, this may comprise the existence of two or more feature triggering symbols. Such symbols might comprise symbols other than the special triggering symbol.

If the first game status or condition exists, then in a step S4, a game feature from a first set of one or more first game features (such as a feature F1) is implemented. In one embodiment, such a feature might comprise a first bonus game or event.

If the first game status or condition does not exist, then in a step S5, it is determined whether a second game status or condition exists. For example, this may comprise an initial reel spin outcome which did not result in a base game win (i.e. the symbols displayed by the reels after the spin did not result in any winning symbol combinations).

If so, then in a step S6, a game feature from a set one or more second game features may be implemented. In a preferred embodiment, either a game feature F2 or a game feature F3 may be implemented. The game feature F2 or game feature F3 may each be implemented with a particular probability, such as a 50% probability for feature F2 and a 50% probability for feature F3.

If the second game status or condition does not exist, then in a step S7, a game feature from a set of one or more third game features may be implemented. In a preferred embodiment, either a game feature F2, a game feature F3 or a game feature F4 may be implemented. The game features may each be implemented with a particular probability, such as 33% for feature F2, 33% for feature F3 and 33% for feature F4.

In one embodiment, based upon the particular logical rule which is met and the associated selected feature, such a feature is activated and/or displayed. In one embodiment, this preferably comprises a transformation of the special trigger symbol into a game display of the implemented feature. For example, various graphical representations may be utilized to show a transformation of the special trigger symbol to the implemented feature (as illustrated in FIG. 9, such might comprise a graphical representation of concentric waves or a mirage effect relative emanating from the special triggering symbol which results in a transformation of the base reel display into the selected feature).

Of course, FIG. 9 illustrates just one preferred configuration of logical rules. Other rules might be applied. For example, upon the occurrence of a trigger, only two game conditions might be evaluated or more than three conditions might be evaluated. Further, there might be as few as one feature associated with each game condition or more than three features associated with each game feature.

The game features may comprise bonus games or a variety of other features. For example, one feature might comprise implementation of a multiplier, transformation of one or more symbols to Wild symbols, one or more free reels spins, nudging of one or more reels from their base position to a modified position, or other features. Preferably, the one or more features provide the player with an opportunity for a winning outcome which has an associated payout, such as of monetary value credits.

In the prior art, various game features are implemented randomly. For example, in the prior art a base game outcome might trigger a first bonus event sometimes and a second bonus event at other times, such that the player cannot predict that their achievement of a particular game condition will result in a favorable secondary event. However, in accordance with the current invention, multiple transformations are implemented in accordance with particular, logical rules. Thus, based upon a particular game outcome, a player knows the particular transformation which will occur.

(5) Reels having Player Selected Symbols

Yet another embodiment of the invention comprises reels having player selected symbols and games and gaming machines having such a feature.

In one embodiment of the invention, a player is permitted to select one or more symbols which are associated with one or more symbol displaying reels. In a preferred embodiment, the reels display a limited set of symbols which include player selected symbols.

One example of the invention will be described with reference to FIGS. 10-13. As illustrated, a set of two or more reels is provided, such as five reels R1, R2, R3, R4 and R5. In one embodiment, each reel is configured to display a limited number of symbols which are selected from a set of the same number of symbols. For example, each reel may have three associated symbols and then be configured to display all three of those symbols (which contrasts markedly with the prior art wherein reels typically have a large number of associated symbols, such as 40 symbols, and are configured to display a sub-set of that set, such as 3 of the 40 symbols).

Figure 10:
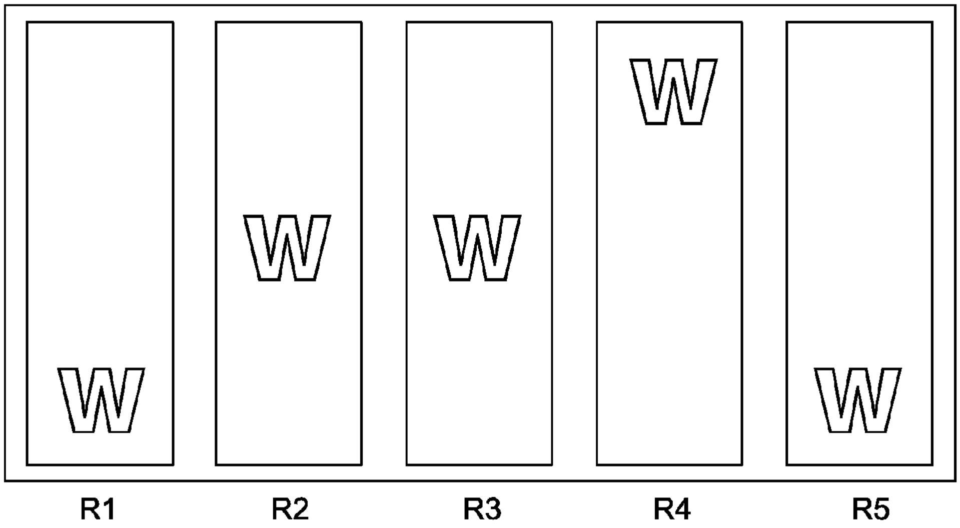
FIGS. 10-13 illustrate an example of a fifth game feature of the present invention.

As illustrated in FIG. 10, one or more symbols may be pre-associated with the one or more reels. In such event, a common symbol is preferably associated with the reels, such as by associating a single Wild symbol with each reel.

Importantly, the player is permitted to select one or more symbols to be associated with the reels. In the scenario where each reel has three associated symbols and one symbol is pre-associated with each reel, the player may be permitted to select two additional symbols.

Figure 11:
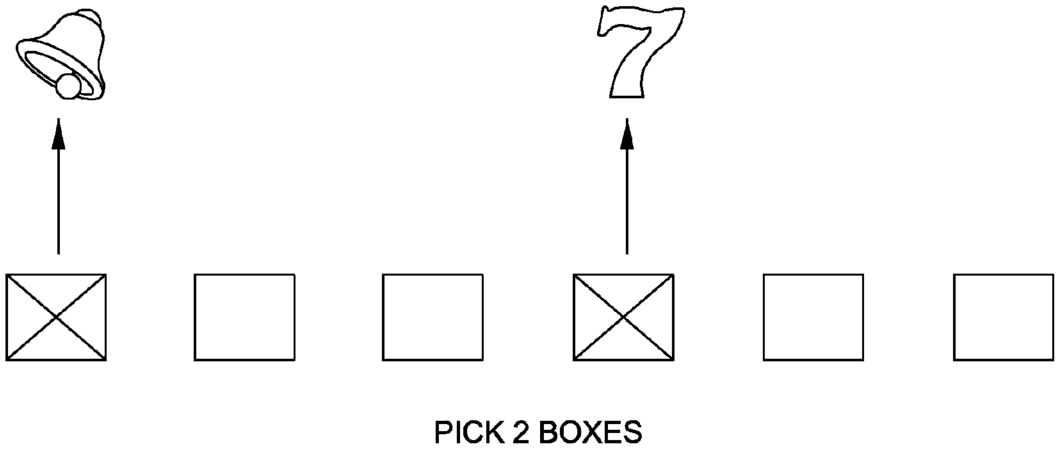

The player may select symbols in various manners. For example, a list of symbols might be shown to the player and the player might select from that list. In another example, the player might make "blind" selections. For example, as illustrated in FIG. 11, a player might select from one or more boxes, icons or elements, each of which has an associated symbol. As illustrated, the player has been given the opportunity to select two boxes from a set of 6 boxes. The player has selected the first and fourth box, thus revealing associated an initially hidden Bell and Seven symbols.

Figure 12:
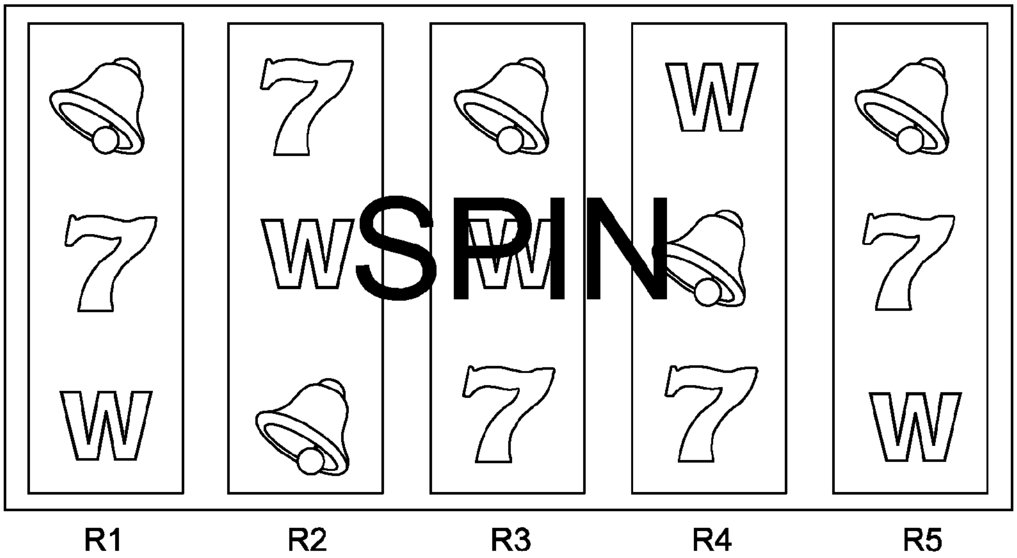

In accordance with the invention, the player's symbols are associated with the reels. In one embodiment, as illustrated in FIG. 12, each player selected symbol is associated with each reel. Thus, in this example, a Bell symbol and a Seven symbol are associated with each reel. As a result, each reel then has three associated symbols: the pre-assigned Wild symbol plus the player-selected Bell and Seven symbols.

Figure 13:
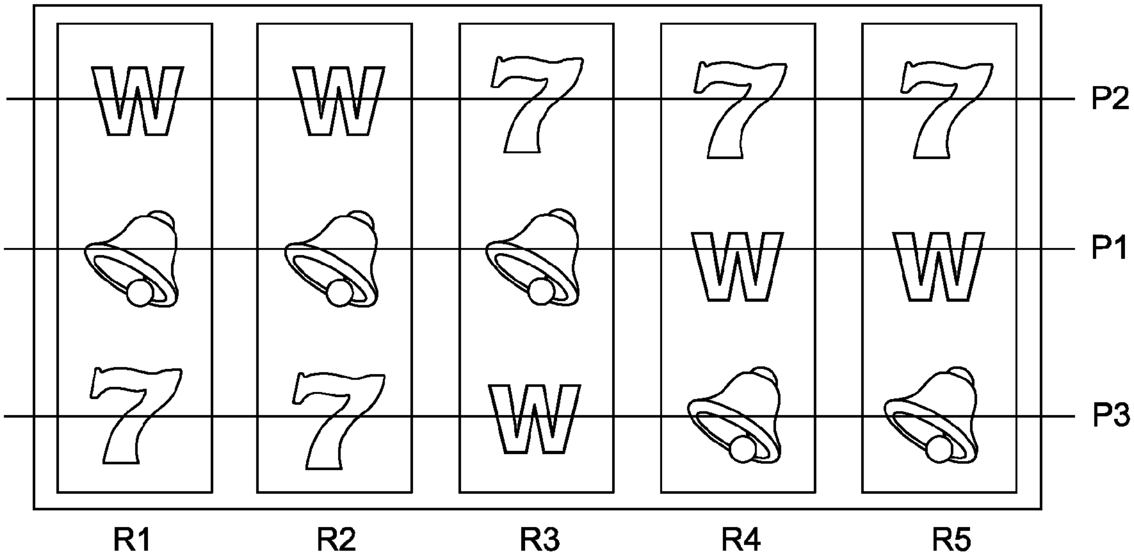

As illustrated in FIG. 13, the reels are then spun and the outcome of the spin is determined. In one embodiment, the outcome of the spin is evaluated for winning symbol combinations, such as defined by a pay table. The symbol combinations may be evaluated in various manners, including along one or more pay lines, in a scatter format or the like. In this example, the symbols have been evaluated along three horizontal pay lines. Winning combinations have resulted along pay lines P1 (five Seven symbols when considering the Wild symbols) and P2 (five Bell symbols when considering the Wild symbols), but not along pay line P3.

Of course, the player may be permitted to select all of the symbols which are associated with a reel or reels, with no symbols being pre-assigned to the reel. In other embodiments, the player may select only one symbol or more than two symbols, such as all three symbols which are associated with each reel.

When the player makes a symbol selection, the player may be given various choices. For example, a player might be shown 14 boxes and be permitted to select only 2 of them.

In one embodiment, the reels may be configured so that they all display the same symbols in the same order, including the order selected by the player. For example, each reel may have a first position filled by a pre-assigned Wild symbol. The player may then select a Bell symbol and that symbol may be posted to the second position of each reel. The player may then select a Seven symbol and that symbol may be posted to the third position of each reel. Of course, even in that configuration, once the reels are spun, they may stop in different positions, thus causing the resulting symbols which are displayed by each reel to be in different positions.

In one embodiment, a player may be permitted to select one or more Wild symbols. This could result in the reels all displaying only Wild symbols, which would automatically result in all combinations of symbols being winning.

In a preferred embodiment of the invention the reels each display all of the symbols which are associated with the reels (i.e. each reel has three associated symbols and display all three symbols as a result of a spin of the reel). However, the reels could display less than the number of associated symbols. For example, the reels could have four associated symbols and only each display three of those symbols as a result of spin. However, preferably one or more the symbols (or all of them) are still selected by the player.

(6) Successive Reel Locking

Another embodiment of the invention comprises a reel locking feature and games and gaming machines having the reel locking feature.

In one preferred embodiment of the invention, at least one special symbol is associated with each reel of a reel-type game. For example, each reel may have at least one Wild symbol associated with it (which special symbol preferably comprises one or more, but not all, of the symbols which are associated with the reel and may thus be displayed by the reel as a result of a reel spin). In one embodiment, if the result of a reel spin is the display of a special symbol, then the reel is locked or its position is fixed relative to one more subsequent spins of any remaining unlocked reels.

In one embodiment, after the feature is initiated the reels are spun a first time. Any reels which display a special symbol are locked and then result of the spin is evaluated. If any reels remain unlocked, those remaining unlocked reels are spun. Once again, if any of the just spun reels display a special symbol, they are locked. Then the outcome of that spin is evaluated (which depends upon the stopping position of the just spun reels with the symbols shown by the previously locked reels). Preferably, the spins continue until all reels are locked (i.e. the reels are not spun a certain fixed number of times).

Figure 14:
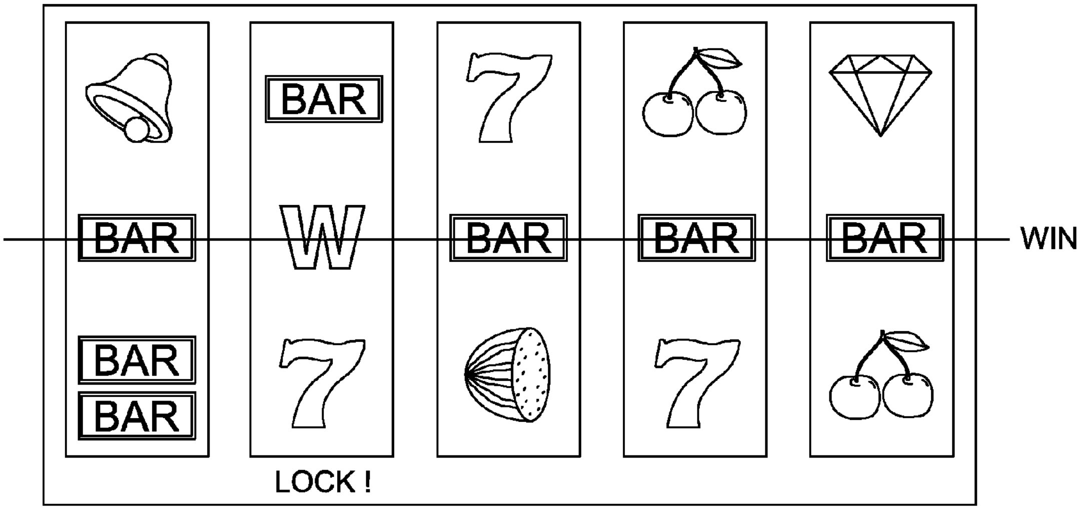
FIGS. 14-15 illustrate an example of a sixth game feature of the present invention.
Figure 15:
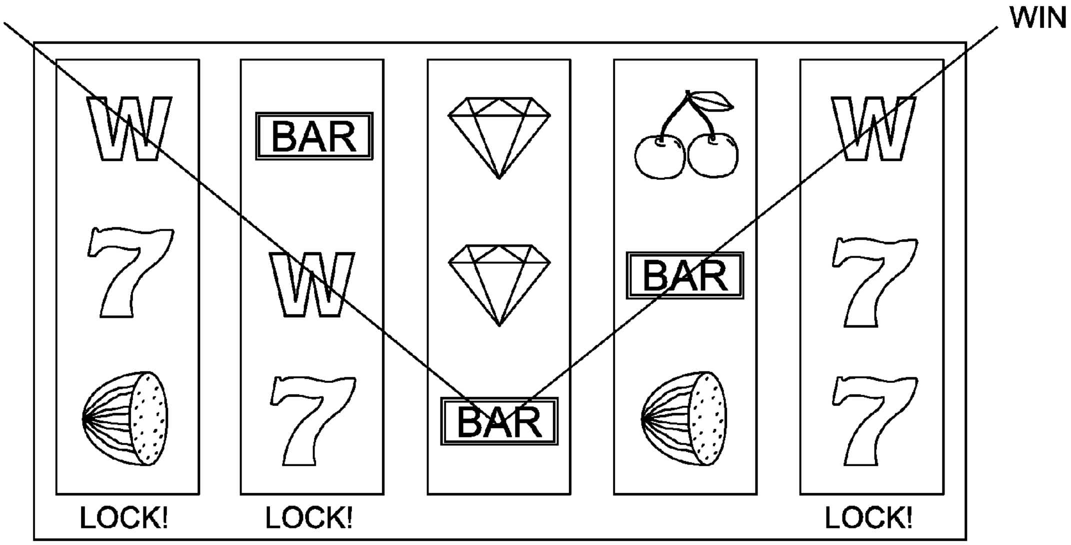

One example of the invention is illustrated in FIGS. 14 and 15. FIG. 14 illustrates the result of a first reel spin of five reels R1, R2, R3, R4 and R5. As illustrated, the second reel R2 displays a special Wild (or W) symbol, and thus this reel is locked. The results of this spin are evaluated for any winning combinations (such as combinations of winning symbols along designated pay lines, etc.). Thereafter, the unlocked reels, reels R1, R3, R4 and R5, are spun. As illustrated in FIG. 15, this has resulted in reels R1 and R5 displaying a special Wild (or W) symbol. The first reel R1 and the fifth reel R5 are then locked (such that reels R1, R2 and R5 are now locked) and the result of this spin is then evaluated for any winning combinations.

Thereafter, the remaining reels, reels R3 and R4 are spun again. This process continues until all of the reels display a special symbol and all of the reels are locked, at which point a final evaluation of the displayed symbols is made for winning combinations.

In one embodiment, the special symbols such as Wild symbols may be located on the reels in particular patterns. For example, each reel might display Wild symbols in sequence or spaced with only one regular symbol in between, whereby interesting and exciting patterns of Wild symbols are generated as the reels are locked. Notably, in the case where the locking reel trigger is a Wild symbol the player is assured of a winning outcome because each reel only locks once a Wild symbol is displayed (such that at the end of the feature, all of the reels must display at least one Wild symbol).

Of course the feature may have various configurations. For example, the Wild symbols may have associated features or other attributes. As one example, Wild symbols may have associated multipliers (e.g. 2×, 3×) depending upon how many reels are locked. For example, once four of five reels are locked, the Wild symbols associated with the last spinning reel may take on a Wild plus 2× attribute, whereby any winning outcome which includes such a wild feature has an award which is doubled in value.

As indicated, once a reel is locked, an indication of that status may be displayed. For example, a locked reel may show the status "LOCKED" or a border may highlight around the reel or the like. Also, in one variation, the results of a spin could be evaluated before the reels which show a special symbol are locked.

Once again, this feature may be implemented in base game or bonus game/event format. For example, in a base game a player might place a wager and be entitled to spin the reels until they are all locked in the manner described above. In another embodiment, a base game outcome might trigger a bonus game or event in which the reels are spun until they are locked in the manner described above.

In preferred embodiments of the invention, games having the features of the invention are presented as wagering games. In such a configuration, a player may place a wager in the form of monetary value credits, points, coins, currency or the like. Preferably, as indicated, the game then offers the player an opportunity or chance for a winning outcome (vs. a losing outcome). In the event of a winning outcome, a player may be awarded an award. While the award may comprise prizes, discounts or the like, in a preferred embodiment one or more of the awards comprise monetary value credits or monies.

As used herein, by the term "wild" it is meant that a particular symbol or position will combine with all other symbols—i.e. takes on the attributes of the other symbols. In this manner, a Wild symbol or symbol position will combine with any other symbol, such as to form winning combinations of symbols, as is well known in the art and thus not described in greater detail herein. As indicated herein, relative to a reel which has a number of associated symbols, a particular symbol of that set of symbols may be a Wild symbol. In other embodiment, a reel symbol position may be wild. For example, a reel may be configured to have three symbol display positions. One or more of those display positions may be designed as wild, regardless of the particular symbol which is displayed in the position.

It will be appreciated that the features of the invention may be implemented individually or they may be combined with one another or with other features.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. An electronic gaming machine configured to present a game to at least one player, the gaming machine comprising:

a controller including at least one random number generator;

at least one electronic display;

at least one player input device;

a wager accepting device; and a non-transitory, computer readable medium comprising machine-readable code, which when executed by the controller, causes the gaming machine to accept a wager from the player via the wager accepting device;

to display at least one slot reel symbol on two or more slot reels on the electronic display in response to the player input on the player input device, wherein each slot reel symbol displayed on each reel is (i) selected from a group of symbols comprising at least one special symbol and (ii) randomly selected based on an output from the random number generator;

to designate the at least one special when the special symbol is displayed by at least one of said two or more slot reels as a collected symbol;

to evaluate said collected symbol for each reel over one or more spins of said reels to determine if collected symbols from the two or more reels comprise a winning combination of collected symbols;

to award an award to said player for receiving a winning combination of collected symbols;

to allow said player to continue to collect special symbols in an attempt to receive a second winning combination of special symbols after a first winning combination of collected symbols is received if not all of a predetermined number of spins have been utilized.

2. The gaming machine in accordance with claim 1 further comprising a wager accepting device and including receiving a wager from said at least one player via said wager accepting device.

3. The gaming machine in accordance with claim 1 further comprising machine-readable code executable by said controller to display said collected symbols apart from said slot reels.

4. The gaming machine in accordance with claim 3 wherein said collected symbols are displayed in one or more locations corresponding to the slot reel which displayed the special symbol.

5. The gaming machine in accordance with claim 4 wherein said locations are at the top of each slot reel.

6. The gaming machine in accordance with claim 3 further comprising causing said collected symbols to no longer be displayed in the event a winning combination of collected symbols is received.

7. The gaming machine in accordance with claim 3 further comprising causing said collected symbols to no longer be displayed after a predetermined number of spins of said two or more reels.

8. The gaming machine in accordance with claim 1 wherein at least one special symbol is uniquely associated with each slot reel and cannot be displayed by any other slot reel.

9. The gaming machine in accordance with claim 1 wherein said at least one special symbol comprises a plurality of letters.

10. The gaming machine in accordance with claim 9 wherein at least one letter is capable of being displayed by each of said slot reels.

11. The gaming machine in accordance with claim 9 wherein at least one winning combination of collected symbols comprises a word spelled by said letters.

12. The gaming machine in accordance with claim 1 wherein said at least one winning combination of collected symbols comprises at least one special symbol collected relative to each slot reel.

13. The gaming machine in accordance with claim 1 wherein each slot reel is capable of displaying at least one slot symbol selected from a group of slot symbols, said group of slot symbols including at least one special symbol and a plurality of other symbols.

14. The gaming machine in accordance with claim 1 wherein said two or more slot reels are graphically represented.

15. The gaming machine in accordance with claim 1, wherein when the special symbol is designated as one of the collected symbols, the special symbol is removed from the reel on which it was displayed.

16. The gaming machine in accordance with claim 1, wherein when the special symbol is designated as one of the collected symbols, the special symbol is converted to a wild symbol.

17. An electronic gaming machine configured to present a game to at least one player, the gaming machine comprising:

a controller including at least one random number generator;

at least one electronic display;

at least one player input device;

a wager accepting device; and a non-transitory, computer readable medium comprising machine-readable code, which when executed by the controller, causes the gaming machine to accept a wager from the player via the wager accepting device;

to display at least one slot reel symbol on two or more slot reels on the electronic display in response to the player input on the player input device, wherein each slot reel symbol displayed on each reel is (i) selected from a group of symbols comprising at least one special symbol and (ii) randomly selected based on an output from the random number generator;

to designate the at least one special when the special symbol is displayed by at least one of said two or more slot reels as a collected symbol:

to evaluate said collected symbol for each reel over one or more spins of said reels to determine if collected symbols from the two or more reels comprise a winning combination of collected symbols;

to award an award to said player for receiving a winning combination of collected symbols:

wherein said at least one winning combination of collected symbols comprises at least two special symbols collected relative to a single of said slot reels.

18. An electronic gaming machine configured to present a game to at least one player, the gaming machine comprising:

a controller including at least one random number generator;

at least one electronic display;

at least one player input device;

a wager accepting device; and a non-transitory, computer readable medium comprising machine-readable code, which when executed by the controller, causes the gaming machine to accept a wager from the player via the wager accepting device;

to display at least one slot reel symbol on two or more slot reels on the electronic display in response to the player input on the player input device, wherein each slot reel symbol displayed on each reel is (i) selected from a group of symbols comprising at least one special symbol and (ii) randomly selected based on an output from the random number generator;

to designate the at least one special when the special symbol is displayed by at least one of said two or more slot reels as a collected symbol;

to display said collected symbols apart from said slot reels to evaluate said collected symbol for each reel over one or more spins of said reels to determine if collected symbols from the two or more reels comprise a winning combination of collected symbols;

to award an award to said player for receiving a winning combination of collected symbols;

wherein said collected special symbols are ranked and lower ranked collected symbols are replaced with higher ranked collected symbols.

* * * * *